United States Patent Office 3,089,903
Patented May 14, 1963

3,089,903
PROCESS FOR PREPARING HALOGENATED ESTERS OF CARBOXYLIC ACIDS
Francesco Minisci, Milan, Italy, assignor to Montecatini Società Generale per l'Industria Mineraria e Chimica, Milan, Italy, a corporation of Italy
No Drawing. Filed Jan. 21, 1960, Ser. No. 3,725
Claims priority, application Italy Feb. 13, 1959
14 Claims. (Cl. 260—487)

This invention relates to a process for the preparation of certain esters that are useful as intermediates in the production of various polyamides.

It is an object of this invention to provide a process for the preparation of certain halogenated esters of carboxylic acids.

Another object is to provide a process for preparing certain halogenated esters of carboxylic acids, which esters are useful intermediates that will further react with other materials such as ammonia, various cyanides, and the like to produce such products as amino acids, lactams, dicarboxylic acids, etc., which products are of great interest in the polyamide field.

Additional objects will become apparent hereinafter.

In accordance with one aspect of this invention an alicyclic hydroperoxide of the general formula

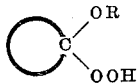

where R is an alkyl group, is reacted with a compound selected from the group consisting of alkaline halides and hydrohalogenic acids, the reaction being carried out in the presence of a suitable catalyst.

The halides of either alkali metals or alkaline earth metals are suitable for the purpose. Thus sodium chloride, potassium chloride, lithium chloride and calcium chloride can be used. A stoichiometric amount of hydrohalogenic acid relative to the employed hydroperoxide is to be used.

The catalyst promotes the decomposition of the hydroperoxidic part of the alicyclic compound. Particularly suitable catalysts are salts of metals having a variable valence, e.g., a multivalent metal, wherein the metal is in its lower valent state, e.g., cuprous or ferrous salts.

The alicyclic hydroperoxide is conveniently obtained by the controlled oxidation of an alicyclic ether, as illustrated by the following schematic reaction

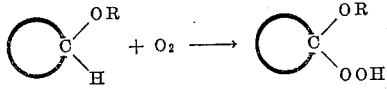

where $R$=alkyl.

By decomposing the alicyclic hydroperoxide with a material capable of promoting the radicalic decomposition of the hydroperoxidic function (e.g., ferrous or cuprous salts) in the presence of hydrohalogenic acids or alkaline halides, halogenated esters are obtained as shown by the following schematic reaction:

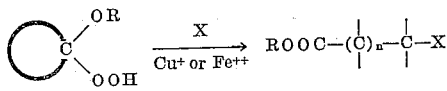

where $X$=Cl or Br, $R$=alkyl, and $n$ is a positive integer.

From cyclohexane derivatives, ε-halogenated esters of caproic acid are obtained:

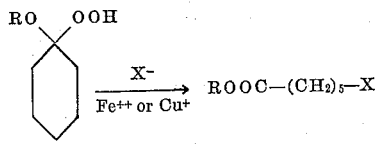

where $X$=Cl or Br, and $R$=alkyl.

From cyclopentane derivatives, halogenated esters of valeric acid are obtained:

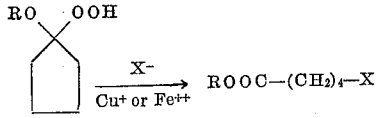

The process of this invention comprises reacting the alicyclic hydroperoxide with a hydrohalogenic acid or alkaline halide at a temperature of between about −20 and about +50° C., or more preferably, at a temperature of between about −10° C. and about +10° C. in the presence of a catalyst capable of promoting the radicalic decomposition of the hydroperoxidic function. Especially suitable as catalysts are salts of metals having variable valence in the lower form of that valence. It is preferable to carry out the reaction by adding the peroxide to an aqueous solution containing the halogen ion and the catalyst for the radicalic decomposition. This facilitates the separation of the products, which are separated by decantation and subsequent fractional distillation.

It is also possible to carry out the reaction in a homogeneous solution by using a suitable solvent, as for example, methanol, ethanol, or the like. However, in this case the separation of the reaction products is less simple inasmuch as it is necessary to distill off the solvent, then to treat with water in order to separate the mineral salt, and to decant the organic portion, which subsequently is subjected to fractional distillation.

The following examples will further illustrate the invention. It will be understood that these examples are given by way of illustration and not limitation. All parts are by weight unless otherwise indicated.

*Example 1*

5 g. peroxide obtained by autoxidation of methylcyclopentylether are added with agitation and in a nitrogen atmosphere, to a solution containing 10 g. ferrous sulfate heptahydrate, 10 cc. concentrated hydrochloric acid, and 40 cc. water, at a temperature of from −5 to 0° C.

After having finished the addition, the water-insoluble organic phase is separated and redistilled. The methyl-δ-chlorovalerate is collected at a temperature of 90 to 91° C. under a pressure of 18 mm.

*Example 2*

Example 1 is repeated substituting 4 g. cuprous chloride for the 10 g. ferrous sulfate of Example 1. The results are identical.

*Example 3*

Example 1 is repeated substituting 6 g. lithium chloride and 4 g. FeCl₃ for the 10 cc. concentrated hydrochloric acid of Example 1. The results are identical.

Example 4

10 g. peroxide obtained by autoxidation of ethylcyclopentylether are added with agitation to a solution of 8 g. cuprous chloride and 15 cc. concentrated hydrochloric acid in 60 cc. water, the temperature being maintained at from 0 to −5° C.

After having carried out the addition, the water-insoluble organic layer is separated, and the ethylchlorovalerate is distilled at 122–123° C. under 40 mm. pressure.

Example 5

Example 4 is repeated substituting 20 g. ferrous sulfate heptahydrate for the 8 g. cuprous chloride of Example 4. The same results are obtained.

Example 6

5 g. peroxide obtained by autoxidation of methylcyclopentylether are added with agitation and cooling (−5 to 0° C.) to a solution containing 10 g. ferrous sulfate heptahydrate, 6 g. hydrobromic acid, and 40 cc. water. After the addition is completed, the organic phase is separated from the aqueous solution. Methyl-δ-bromovalerate is distilled off at 77–78° C. under 4 mm. pressure.

Example 7

Example 6 is repeated substituting 4 g. cuprous chloride for the 10 g. ferrous sulfate of Example 6. The same results are obtained.

Example 8

7 g. peroxide obtained by oxidation of ethylcyclopentylether are added with agitation and in a nitrogen atmosphere to a solution containing 6 g. cuprous chloride, 5 g. hydrobromic acid, and 50 cc. water at a temperature of −5° C. The organic phase, insoluble in water, is separated and fractionally distilled. Ethyl-δ-bromovalerate is collected at 107–108° C., 20 mm. pressure.

Example 9

Example 8 is repeated substituting 15 g. ferrous sulfate heptahydrate for the 6 g. cuprous chloride of Example 8. The same results are obtained.

Example 10

15 g. peroxide obtained by autoxidation of methylcyclohexylether are added with agitation and cooling (0–3° C.) to a solution containing 13 g. cuprous chloride, 25 cc. concentrated hydrochloric acid, and 70 cc. water. By separating and distilling the water-insoluble organic phase, methyl-ε-chlorocaproate is obtained. This compound boils at 100–101° C. under 16 mm. pressure.

Example 11

Example 10 is repeated substituting 30 g. ferrous sulfate heptahydrate for the 13 g. of cuprous chloride of Example 10. The same results are obtained.

Example 12

12 g. peroxide obtained by oxidation of ethylcyclohexylether are added with stirring and in a nitrogen atmosphere to a solution containing 26 g. ferrous sulfate, 20 cc. concentrated hydrochloric acid, and 60 cc. water at a temperature ranging from −3 to 0° C.

The organic phase, which is almost insoluble in water, is separated and ethyl-ε-chlorocaproate is distilled at a temperature ranging from 107 to 108° C., under 15 mm. Hg pressure.

Example 13

Example 12 is repeated substituting cuprous chloride for the ferrous sulfate of Example 12. The same results are obtained.

Reference is made to my copending applications as follows:

Serial No. 734,448, filed May 12, 1958, co-pended with the instant application, and was subsequently abandoned. Serial No. 734,448 describes the preparation of a number of epsilon-substituted derivatives of caproic acid from cyclohexane peroxide, namely the chloro-, bromo-, iodo-, and cyano-derivatives. More precisely, my copending application Serial No. 734,448 discloses processes for preparing an epsilon-halo-caproic acid, in which the halo substituent is taken from the group consisting of chlorine, bromine, and iodine, comprising treating cyclohexanone peroxide with a member of the group consisting of hydrohalic acids, alkali metal halides, and alkaline earth metal halides in the presence of a redox promoter comprising a heavy metal salt in which the metal is a multivalent metal and is present in a lower valence state, at a temperature of about −20° to +50° C., and contains fourteen examples which are incorporated herein by reference.

Serial No. 788,491, filed January 23, 1959, replaces Serial No. 734,448. The new processes of Serial No. 788,491 were therein generally defined as designed to obtain epsilon-substituted derivatives of caproic acid from peroxides, and were characterized in that an oxy-peroxide having the following general formula

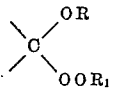

wherein R and $R_1$ are equal or different groups, consisting of H or an alkyl or cycloalkyl, is reacted with a hydrohalic acid or an alkaline halide, cyanide, sulfocyanide, thiosulfate or azide or sulfur dioxide, thus obtaining halogen-, cyano-, sulfocyano-, dithio- or azido-derivatives or sulfonic acids, respectively, and in that the reaction is carried out at between −20° and +50° C., preferably in aqueous solution at between −10° and +10° C., in the presence of substances capable of causing the decomposition of the peroxide into free radicals, in particular the salts of heavy metals having a variable valence, in their lower valence. Serial No. 788,491 contains twenty-five examples which are incorporated herein by reference. Serial No. 788,491 also contains the fourteen examples of Serial No. 734,448.

Reference is also made to my copending application Serial No. 1,410, filed January 11, 1960. That application describes a process which comprises decomposing, in the presence of hydrohalic acids or of alkaline halides, hydroperoxides having the following structure:

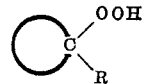

where R is an alkyl, aryl or cycloalkyl residue.

As decomposition agents, substances capable of bringing about the radicalic decomposition of the hydroperoxidic function are used, such as ferrous and cuprous salts. From the cyclohexanone derivatives, the following ketones are obtained:

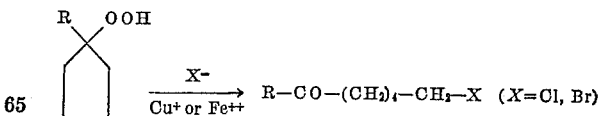

From cyclopentane derivatives:

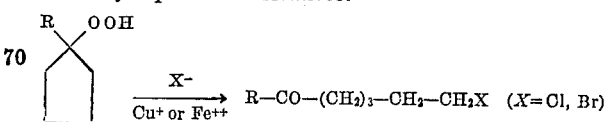

The process of Serial No. 1,410 consists in reacting the above-mentioned peroxides with halohydric acids or with alkaline halides, at temperatures ranging between −20 and +50° C., preferably between −10 and +10° C., in the presence of typical substances of redox systems suitable for causing the radicalic decomposition of peroxides, in particular, heavy metal salts having a variable valency, employed in the lowest valency form. All of the examples of Serial No. 1,410 are included herein by reference.

The products are of great practical interest. The methyl and ethyl esters of delta-chloro-valeric acid are readily reacted with ammonia to produce the esters of the corresponding amino-acid, which have known uses as such, or can be hydrolyzed to the free amino-acid and lactam. Such procedures are obvious to persons skilled in the art, and are readily reached through a brief inspection of the indices of American or British Chemical Abstracts.

Having thus described this invention, what is desired to be secured and claimed by Letters Patent is:

1. A process for preparing an ester of an omega halogenated carboxylic acid, the process comprising treating an alicyclic ether hydroperoxide of the general formula

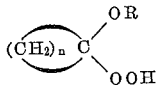

where $n$ is an integer from 4 to 5 and $R$ = lower alkyl, with a compound selected from the group consisting of hydrohalogenic acids and alkali and alkaline earth metal halides in the presence of a reducing agent comprising a multivalent metal catalyst, the metal being added exclusively in a lower valence state, the hydrohalogenic acid being taken from the group consisting of hydrogen chloride and bromide, the said metal halides being taken from the group consisting of chlorides and bromides, the reaction being according to the following scheme:

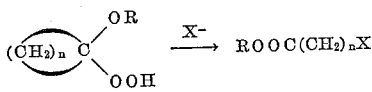

in which X− is taken from the group consisting of chlorine and bromine ions, the reaction being carried out by adding the hydroperoxide to an aqueous solution containing the said compound and said reducing agent, so that said ester separates out as a water-insoluble phase.

2. The process of claim 1 carried out at a temperature of from about −20 to about +50° C.

3. The process of claim 1 carried out at a temperature of from about −10 to about +10° C.

4. The process of claim 1 wherein the catalyst is selected from the group consisting of ferrous and cuprous salts.

5. The process of claim 1 wherein the alicyclic hydroperoxide is a cyclohexyl hydroperoxide.

6. The process of claim 1 wherein the alicyclic hydroperoxide is a cyclopentyl hydroperoxide.

7. The process of claim 1 wherein the ether hydroperoxide is selected from the group consisting of methylcyclopentylether and ethylcyclopentylether hydroperoxide.

8. The process of claim 1 wherein the ether hydroperoxide is selected from the group consisting of methylcyclohexylether and ethylcyclohexylether hydroperoxide.

9. A process of making methyl-delta-chloro-valerate, comprising treating methylcyclopentylether hydroperoxide with hydrochloric acid, and water, at −20° to +50° C., in the presence of a redox catalyst of the group consisting of ferrous and cuprous ions, the redox catalyst being added exclusively in the ferrous and cuprous state, the reaction being carried out by adding the hydroperoxide to an aqueous solution of hydrogen chloride and said redox agent.

10. A process of making methyl-delta-chloro-valerate, comprising treating methylcyclopentylether with lithium chloride, and water, at −20° to +50° C., in the presence of ferrous chloride redox catalyst, the redox catalyst being added exclusively in the ferrous state, the reaction being carried out by adding the hydroperoxide to the aqueous solution of lithium chloride and ferrous chloride.

11. A process for preparing an ester of an omega halogenated carboxylic acid, the process comprising treating an alicyclic ether hydroperoxide of the general formula

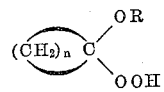

where $n$ is an integer from 4 to 5 and $R$ = lower alkyl, with a compound selected from the group consisting of hydrohalogenic acids and alkali and alkaline earth metal halides in the presence of a reducing agent comprising a multivalent metal catalyst, the metal being added exclusively in a lower valence state, the hydrohalogenic acid being taken from the group consisting of hydrogen chloride and bromide, the said metal halides being taken from the group consisting of chlorides and bromides, the reaction being according to the following scheme:

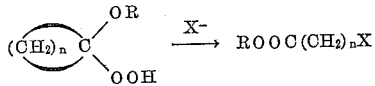

in which X− is taken from the group consisting of chlorine and bromine ions, the catalyst being a redox catalyst of the group consisting of ferrous and cuprous ions, the process being carried out in water at about −10 to about +10° C., the reaction being carried out by adding the hydroperoxide to an aqueous solution containing the said compound and said reducing agent, the said ester being separated as a water-insoluble phase.

12. The process of claim 11, the catalyst being ferrous sulfate.

13. The process of claim 11, the catalyst being ferrous chloride.

14. The process of claim 11, the catalyst being cuprous chloride.

References Cited in the file of this patent

UNITED STATES PATENTS

| | | |
|---|---|---|
| 2,905,712 | Braunwarth et al. | Sept. 22, 1959 |
| 2,938,918 | Lavigne | May 31, 1960 |
| 2,967,197 | Crosby et al. | Jan. 3, 1961 |
| 2,983,751 | Braunwarth | May 9, 1961 |